May 5, 1942.        E. C. STEWART        2,281,727
SIFTER
Filed Nov. 20, 1939

INVENTOR.
ELEANOR C. STEWART
BY Harold W. Mattingly
ATTORNEY

Patented May 5, 1942

2,281,727

UNITED STATES PATENT OFFICE 2,281,727

SIFTER

Eleanor C. Stewart, Pasadena, Calif.

Application November 20, 1939, Serial No. 305,253

1 Claim. (Cl. 221—95)

My invention relates to household sifters and has particular reference to a sifter from which the contents are ejected during the sifting operation directly into a measuring receptacle.

In the art of cooking, the precise measurements of desired ingredients, such as flour, are usually stated in terms of dry measure and in fact in terms of "sifted" material. It is well understood that a given volume of unsifted flour, for example, will actually produce a greater volume of sifted flour when passed through the usual sifting apparatus.

Heretofore the flour sifters commonly employed in kitchens have comprised a relatively large diameter receptacle into which the flour or other ingredients are placed and having a suitable mesh partition extending thereacross through which the flour or other material must pass, assisted by agitation, either mechanical or manual.

However, in measuring small quantities of "sifted" flour or other "sifted" material, considerable difficulty has been experienced due to the fact that it has been necessary to first sift the materials onto paper or into a suitable vessel, from which the sifted material must be poured into measuring cups or other similar measuring devices. The result of such collecting and repouring of the sifted material effectively defeats the very purpose for which the material was originally sifted, namely, the contents become repacked.

It is therefore an object of my invention to provide a sifter for flour or similar ingredients, in which the flour or other material may be directly ejected from the sifter into a measuring vessel, without requiring transfer of the materials through intermediate vessels.

Another object of my invention is to provide a sifter of the character described wherein the body of the sifter may be made adequately large in diameter to present large areas of mesh through which the material may be sifted and may be fitted with a small diameter spout adapted to be received within a standard measuring cup.

Another object of my invention is to provide a construction as set forth in the preceding paragraphs, in which a measuring cup may be detachably secured to the outlet of the sifter to thereby permit ready handling of the assembled sifter and cup.

Another object of my invention is to provide a sifter of the character set forth, in which the measuring receptacle comprises a transparent measuring vessel through the transparent walls of which the measured quantity of material is viewed as it is being ejected into the receptacle.

Figure 1:
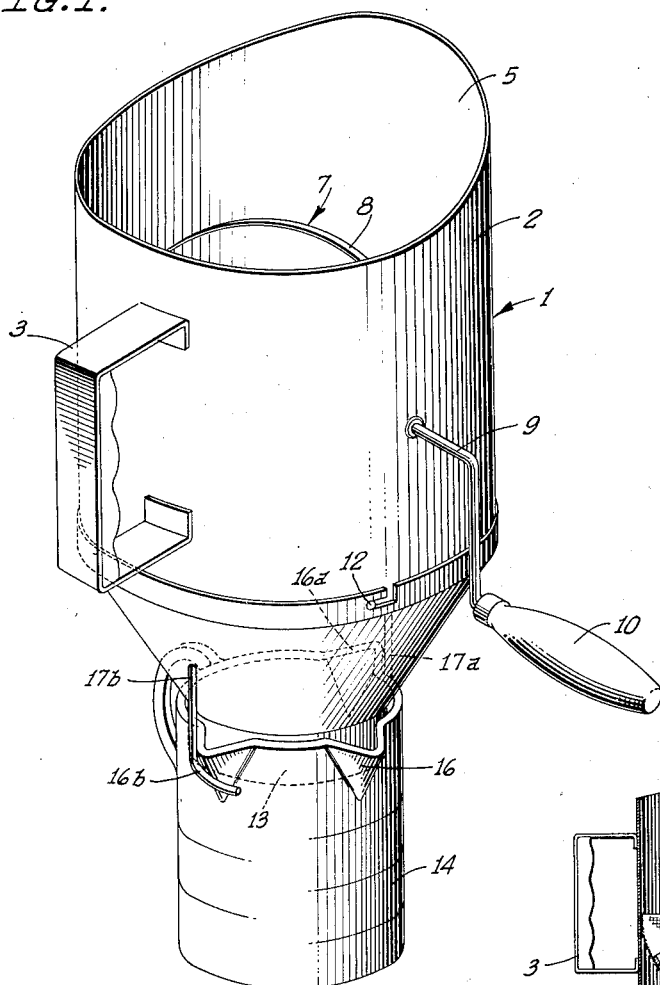
Figure 2:
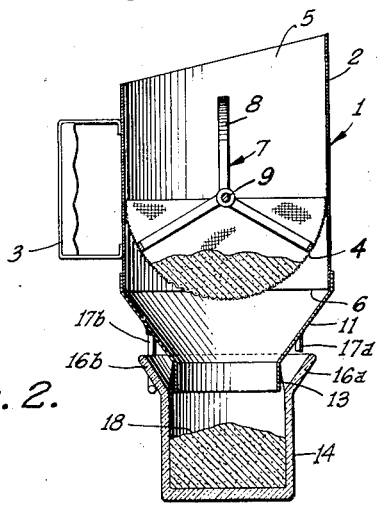

Other objects and advantages of my invention will be apparent from a study of the following specifications, read in connection with the accompanying drawing, wherein Fig. 1 is a perspective view of a sifter constructed in accordance with my invention; and Fig. 2 is a vertical sectional view taken along lines II—II of Fig. 1.

Referring to the drawing, I have illustrated a flour sifter constructed in accordance with my invention as shown in Fig. 1 as including a body portion or receptacle 1 which may have any suitable shape, though I prefer the same to comprise a vertically disposed cylindrical member 2 formed of sheet metal or other suitable material. Upon one side of the cylindrical member 2 may be provided a handle 3 by which the receptacle 1 may be held and transported. A suitable mesh partition 4 (see Fig. 2) is disposed within the receptacle 1 so that flour or similar material to be sifted may be placed or poured into the open end 5 of the receptacle and must pass through the mesh 4 in order to pass out of the lower end 6 of the receptacle.

At 7 I have illustrated one conventional agitating device which may be employed to agitate the flour or other material and thus insure complete passage of all of the material through the mesh 4, this agitator comprising a plurality of arcuate arms 8 having a curvature corresponding to the curvature of the mesh or screen 4 and secured upon a suitable shaft 9, the outer end of which may be bent into a suitable crank form and may be provided with a handle 10 by which the agitator 7 may be rotated. Any other conventional construction of mesh screen and agitating device may be employed.

In order, however, that the materials placed in the sifter may be directly ejected therefrom into a measuring vessel, such as a conventional or standard measuring cup, I provide a funnel-like base 11 upon the lower or exit end 6 of the receptacle 1, such base being either permanently secured to the receptacle 1 or detachably secured thereto as illustrated in Fig. 1 by means of any suitable detachable connection such as a pin and bayonet slot connection 12.

The lower end of the funnel-like base 1 is preferably provided with a downwardly depending skirt 13 adapted to be received well within the upper end of a measuring vessel 14.

While the measuring vessel 14 may be constructed of any suitable material and in fact may be a conventional metal or glass measuring cup, I prefer to employ a measuring cup constructed of transparent material such as may be readily purchased in the open market, provided with a suitable handle 15 and one or more pouring lips 16. One such transparent measuring cup which has become substantially standard includes one pouring lip 16 disposed on the side of the measuring vessel opposite to the handle 15 while a pair of additional pouring lips 16a and 16b are disposed in diametrically disposed relation to each other midway between the handle and the lip 16.

When employing a vessel of this character, I utilize the lips 16a and 16b as a ready means for detachably securing the measuring vessel to my sifter as by providing downwardly extending hook-like arms 17a and 17b secured to or formed upon the funnel-like base 11 and having their hooked ends disposed in such relation as to readily engage beneath the lips 16a and 16b.

In using a sifter constructed in accordance with my invention to measure a desired quantity of "sifted" flour or other material, a quantity of such material approximately or exceeding the desired measurement is deposited in the open end 5 of the sifter receptacle 1 and the measuring vessel 14 is attached to the lower end of the receptacle 1 or to its detachable base. Thus by operating the agitator 7, the flour or similar material will be passed through the mesh in a sifted condition and be deposited directly into the measuring vessel 14 as indicated at 18 in Fig. 4.

In view of the fact that the measuring vessel is secured to the sifting receptacle 1, a slight shaking of the assembled devices will level out the contents 18 in the measuring vessel so that by merely looking through the transparent walls of the measuring vessel, the exact quantity of sifted material therein may be accurately observed.

While I have shown and described the preferred embodiment of my invention, I do not desire to be limited to any of the details of construction shown or described herein, except as defined in the appended claim.

I claim:

In a measuring device, the combination of: a measuring vessel comprising an open topped cylindrical member having at least a pair of diametrically opposed pouring lips formed on the upper edge thereof, said lips extending outwardly from said cylindrical member; a funnel-like member having a larger upper end for receiving material to be conveyed to said vessel and having a smaller lower end adapted to be received within said vessel; and means for detachably securing said vessel to said funnel-like member comprising a pair of arms secured to said funnel-like member and extending downwardly therefrom in positions to lie outside of said cylindrical member, the lower ends of said arms being extended horizontally in opposite directions substantially at right angles to a line joining said arms and in positions to extend below and engage the under sides of the opposite one of said pouring lips when said vessel is placed in a position encircling said smaller lower end of said member and turned to a position so engaging said lips with said arms, whereby said vessel may be detached from said funnel-like member by rotating said vessel sufficiently to move said pouring lips beyond the ends of the horizontal portions of said arms, and whereby said pouring lips may be used as such when said vessel is so detached.

ELEANOR C. STEWART.